Patented Mar. 24, 1953

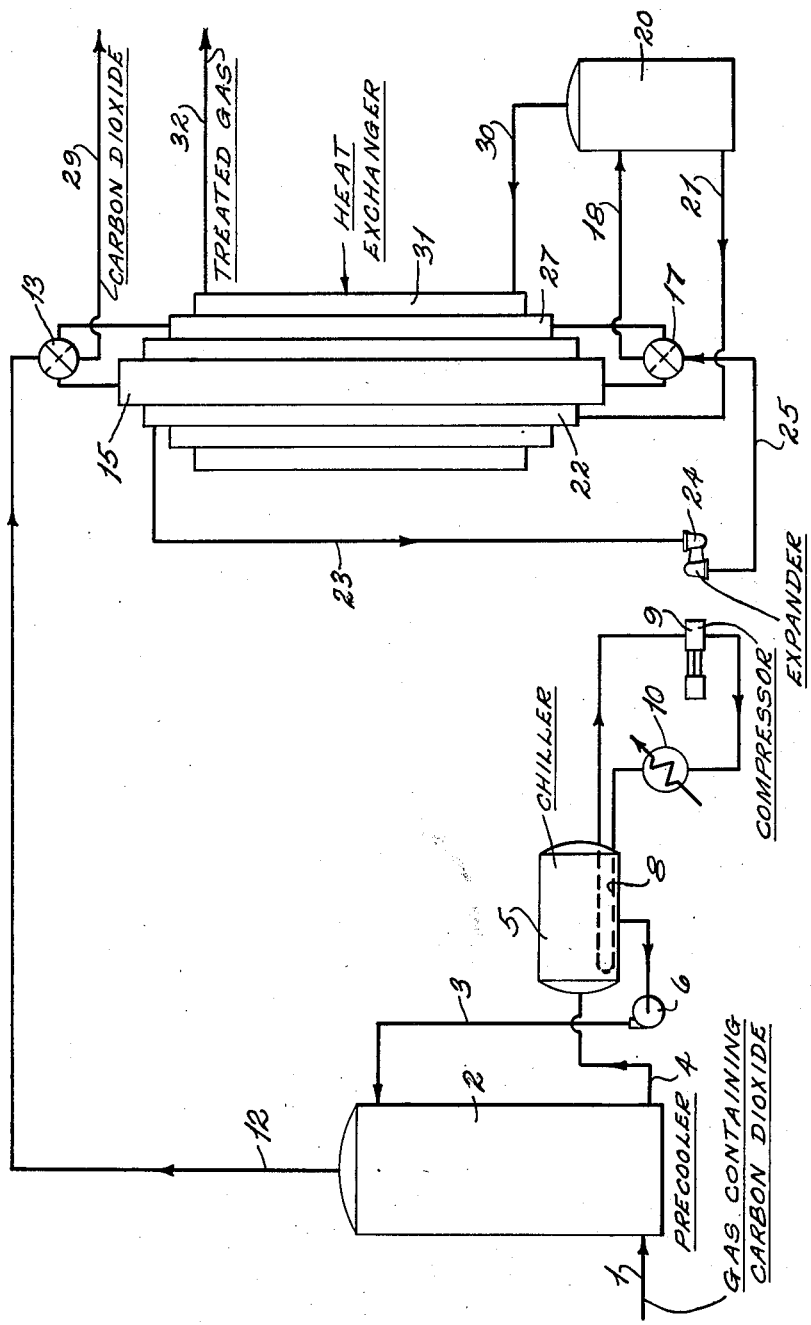

2,632,316

UNITED STATES PATENT OFFICE 2,632,316

SEPARATION OF CARBON DIOXIDE FROM GASEOUS MIXTURES du Bois Eastman, Whittier, Calif., assignor to The Texas Company, New York, N. Y., a corporation of Delaware Application November 4, 1950, Serial No. 194,179

2 Claims. (Cl. 62—175.5)

This invention relates to a process for the separation of carbon dioxide from a gaseous mixture. In one of its more specific aspects it relates to a process for the selective condensation of carbon dioxide from a mixture of carbon oxides, hydrogen, and gaseous hydrocarbons. The process is applicable to the selective removal of carbon dioxide from hydrogen, carbon monoxide, methane, and similar fixed gases.

The separation of carbon dioxide from a mixture of gases is a problem often encountered in chemical processing. Water and selective solvents are commonly used for this purpose. Where large volumes of gas are treated, particularly gaseous mixtures containing a relatively high carbon dioxide content, removal of carbon dioxide by these processes becomes a costly operation.

Recently there has been considerable interest in the gasification of solid fuels, e. g., coal, and low grade liquid fuels to produce fuel gas. These fuels may be converted to carbon monoxide and hydrogen by reaction at elevated temperatures with oxygen and steam. Gasification is effectively accomplished at temperatures within the range of from about 2000 to about 3000° F. The product gas from the gasification zone is a relatively poor fuel gas, since it consists essentially of hydrogen and carbon monoxide, both of which have a gross heating value of about 340 B. t. u.'s per cubic foot. It is desirable to produce a fuel gas having a gross heating value in excess of 500 B. t. u.'s per cubic foot for metropolitan distribution.

Methane may be synthesized by the reaction of carbon monoxide with hydrogen in the presence of a suitable catalyst, for example, iron oxide, nickel, or molybdenum sulfide. The methanization reaction may be conducted at a temperature within the range of from about 1000° F to about 1800° F. At the lower temperatures, the methane content of the equilibrium product is higher than at the higher temperatures within this range. The methanization reaction produces carbon dioxide as a by-product. For this reason, the heating value of the raw methanized gas is little better than the original carbon monoxide-hydrogen mixture. A fuel gas having a heating value in excess of 500 B. t. u.'s per cubic foot may be prepared by methanization of a carbon monoxide-hydrogen mixture followed by removal of carbon dioxide.

Mixtures of carbon monoxide and hydrogen are generated commercially for the synthesis of hydrocarbons, oxygenated hydrocarbons, alcohols, and the like. Carbon monoxide and hydrogen mixtures may be prepared by the partial oxidation of a carbonaceous fuel. Carbon dioxide inevitably appears in the product of the partial oxidation process to a greater or lesser extent.

Often it is desirable to convert carbon monoxide to hydrogen by the so-called water-gas shift reaction. In this reaction, steam is reacted with carbon monoxide to yield hydrogen and carbon dioxide. For each mol of carbon monoxide reacted, a mol of hydrogen may be produced by the water-gas shift reaction, producing at the same time a mol of carbon dioxide.

The present invention takes advantage of the wide difference in boiling points between carbon dioxide and those gases most commonly associated therewith in commercial processes. These gases are generally carbon monoxide, hydrogen, nitrogen and gaseous hydrocarbons.

In the process of this invention, carbon dioxide is selectively removed from a mixture of gases including carbon dioxide by condensation of carbon dioxide from the mixture at superatmospheric pressure. Carbon dioxide has a liquefaction temperature well above that of hydrogen, carbon monoxide, nitrogen, and methane, the gases most commonly associated with carbon dioxide. The dew points of the individual pure gases in degrees Fahrenheit at various superatmospheric pressures are:

|                 | 5 atm. | 20 atm. | 40 atm. | 60 atm. |
|-----------------|--------|---------|---------|---------|
| Carbon dioxide  | −70    | −2      | 43      | 72      |
| Carbon monoxide | −275   | −237    | (−217)  | (−217)  |
| Hydrogen        | −411   | (−400)  | (−400)  | (−400)  |
| Methane         | −217   | −163    | −123    | (−116)  |
| Nitrogen        | −290   | −251    | (−233)  | (−233)  |

NOTE.—The numbers in parenthesis in the above table are critical temperatures of the gases, the pressure in each instance being above the critical pressure of the particular substance.

In accordance with this invention a stream of gas containing carbon dioxide is treated at superatmospheric pressure, for example, from about 50 to about 800 pounds per square inch gauge, or higher, and cooled to a temperature below the dew point of carbon dioxide to condense carbon dioxide from the mixture. The condensed carbon dioxide is then separated from the uncondensed gases.

Various percentages of the carbon dioxide content of the mixture may be thus removed, the efficiency of the separation depending largely upon the temperature to which the mixture is cooled and, to a lesser extent, upon the pressure at which the condensation and separation are effected. In general, as the pressure is increased at a given temperature below the condensation temperature, or dew point, of carbon dioxide, the amount of carbon dioxide condensed from the mixture increases. It will be appreciated that the condensate will contain minor amounts of the other components. These may be recovered from the carbon dioxide by rectification. Usually, however, rectification is not necessary, as the amount of other gases lost by condensation with the carbon dioxide is relatively small. Similarly, as the temperature is decreased at a given pressure, the amount of condensate increases. The temperature and pressure required to give the desired degree of separation for any given mixture may be readily determined by trial or by methods known to those skilled in the art. It is not desirable to employ a temperature below $-70°$ F., the temperature at which solid carbon dioxide is formed.

The cooling is preferably accomplished by passing the gas through a heat exchanger in indirect heat exchange relation with outgoing treated gas and carbon dioxide. A reversing exchanger is used which may be either the regenerative or recuperative type. The incoming gas is cooled by indirect heat exchange with treated gas and recovered carbon dioxide. The treated gas and the outgoing carbon dioxide flow through the exchanger along separate flow paths. Periodically the path of flow of the carbon dioxide and the incoming gas stream are reversed, the carbon dioxide flowing through the flow path previously used by the gas stream and the gas stream flowing along the path previously used for the carbon dioxide. Preferably, the direction of flow along the respective paths is reversed with each reversal of the streams. As the gas undergoing treatment for removal of carbon dioxide is passed through the heat exchanger, it is chilled to a temperature below the dew point of the carbon dioxide causing condensation of carbon dioxide from the gas stream. Any moisture present in the gas undergoing treatment will solidify in the heat exchanger, either as ice or as a gas hydrate. Upon reversal of the streams, the outgoing carbon dioxide is brought into contact with the solidified moisture in the heat exchanger path whereupon it is evaporated into the carbon dioxide and removed from the heat exchanger. Reversing exchangers and their operation are well known in the art of rectification of air.

In the rectification of air, carbon dioxide, which is present in the air in minor amounts, is solidified in the heat exchanger and thus removed from the air stream. In the present process, however, relatively large amounts of carbon dioxide are present in the gas stream and cooling is effected at temperatures not below $-70°$ F. and at a superatmospheric pressure on the order of 5 atmospheres or above, whereupon carbon dioxide is liquefied, rather than solidified, in the heat exchanger.

The carbon dioxide condensate is separated from the remaining gas in a liquid-gas separation step. This condensate has a high heat capacity as a refrigerant. Preferably it is passed into countercurrent heat exchange with the incoming gas stream in two separate stages. In the first stage the condensate is evaporated at a pressure somewhat below the condensation pressure. The re-evaporated condensate is then expanded to a lower temperature and pressure to give a low temperature gas stream which is passed through the heat exchanger as the outgoing stream of carbon dioxide. It is this stream which upon reversal is passed through the flow path formerly occupied by the incoming gas stream.

The process of the present invention will be more readily understood from the following detailed description and with reference to the accompanying drawing. The accompanying drawing illustrates, diagrammatically, a preferred arrangement of the apparatus for practicing the process of this invention.

Referring to the drawing, the gas stream containing carbon dioxide is introduced through line 1 into a precooler 2 wherein the gas is chilled to a temperature above the freezing point of water, e. g., 40° F., suitably by countercurrent contact with cold water in a liquid-vapor contact apparatus. This precooling insures relatively moisture-free gas for subsequent processing; any moisture contained in the gas stream is substantially completely removed by condensation. If complete removal of moisture is required, chemical processing of the gas may be employed. A stream of chilled water is continuously supplied to the upper part of the precooler 2 through line 3. Water is continuously withdrawn from the precooler 2 through line 4 and passed into chilling drum 5 where it is cooled prior to recirculation by pump 6 through line 3. Refrigeration is provided in the cooling drum by means of a refrigeration system comprising an evaporator coil 8, compressor 9 and condenser 10. The refrigerant may be condensed in the condenser 10 by ordinary cooling water.

Scrubbed gas passes through line 12 to a reversing valve 13. With the valve in the position shown by the solid line, the gas passes through flow path 15 of a reversing heat exchanger wherein it is cooled to a temperature below the dew point of carbon dioxide by indirect heat exchange with streams of separated carbon dioxide and treated gas, as will be described in more detail hereinafter. The cooled gas and condensed carbon dioxide pass to a reversing valve 17. With valve 17 in the position indicated by the solid line, the gases and liquefied carbon dioxide condensate are directed through line 18 into an accumulator 20.

Condensate is withdrawn from the accumulator 20 through line 21 and passed through flow path 22 of the heat exchanger wherein it is evaporated at a pressure somewhat less than the pressure in the accumulator. The resulting gas, comprising mainly carbon dioxide, passes through line 23 to an expander 24. Power recovered in expansion of the gases in expander 24 may be utilized in compressing the refrigerant in compressor 9.

The expanded gases from expander 24 pass under reduced pressure through line 25 to the reversing valve 17. With the valve in the position illustrated by the solid line, the low pressure carbon dioxide stream passes into flow path 27 of the heat exchanger. These gases, after heat exchange with the incoming stream, pass to the reversing valve 13 where they are directed into line 29 for disposal.

Treated gas from which carbon dioxide has been largely removed is discharged from the accumulator 20 through line 30 into flow path 31 of the heat exchanger. This treated gas passes in indirect heat exchange with the incoming gas and is discharged through line 32.

Periodically, valves 13 and 17 are switched to the position shown by the dotted lines. This affects reversal of the incoming gas stream and the outgoing carbon dioxide. With the valves in the position illustrated by the dotted lines, the chilled gas stream from line 12 is directed into flow path 27 of the heat exchanger, after which it passes to valve 17 where it is directed through line 18 into accumulator 20. Similarly, the expanded carbon dioxide from line 25 is directed by valve 17 (when in the position shown by the dotted line) through flow path 15 of the heat exchanger to valve 13 and into line 29. The reversal of these streams is made as often as necessary to prevent accumulation of sufficient solid material in the heat exchanger to interfere with the flow of the gases therethrough.

It will be understood that the flow paths in the heat exchanger are suitably provided with expanded metal heat exchange elements which facilitate transfer of heat from one stream to another.

A commercial application of the process of this invention is illustrated in the following example.

Fuel gas is generated from anthracite fines by reaction with oxygen and steam at 600 pounds per square inch gauge and 2,300° F. Raw coal is charged at the rate of 3,395 tons per day. The raw coal has an average moisture content of 6 per cent and an average ash content of 20 per cent on a moisture-free basis. Oxygen of 95 volume per cent purity is charged at the rate of 59 million standard cubic feet per day and steam, at the rate of 1,908 tons per day. The coal is dispersed in steam and fed at 1,000° F.; the oxygen is preheated to 260° F.

Raw product is produced at the rate of about 11 million standard feet per hour and has the following composition:

| | Mol per cent |
|---|---|
| Carbon monoxide | 54.8 |
| Carbon dioxide | 4.8 |
| Water | 7.8 |
| Hydrogen | 31.1 |
| Nitrogen | 1.4 |
| Methane | 0.1 |

The raw product gas is cooled to 1,000° F. in a boiler for the generation of steam, passed through a cyclone separator to remove entrained dust and fed to a methanizer. In the methanizer it is contacted with a fluidized mass of iron oxide at 600 pounds per square inch gauge for the synthesis of methane. The methanized product is cooled to 100° F. with cooling water in a wash tower to give a product of the following composition:

| | Mol per cent |
|---|---|
| Carbon monoxide | 13.5 |
| Carbon dioxide | 50.9 |
| Water | 0.3 |
| Hydrogen | 3.0 |
| Nitrogen | 2.2 |
| Methane | 30.1 |

This gas has a gross heating value of 358 B. t. u.'s per cubic foot.

The gas from the water scrubber is passed into a precooler where it is passed into countercurrent contact with water refrigerated to 35° F. This cools the gas to 40° F., removing substantially all of the water from the gas stream. The 40° F. gas composition is:

| | Mol per cent |
|---|---|
| Carbon monoxide | 13.5 |
| Carbon dioxide | 51.1 |
| Water | trace |
| Hydrogen | 3.0 |
| Nitrogen | 2.2 |
| Methane | 30.2 |

The precooled gas flows through one path of a four pass reversing heat exchanger where it is further cooled to −65° F. At this temperature most of the carbon dioxide is condensed and separated as a liquid phase in an accumulator. The accumulator vapors pass through a second flow path of the heat exchanger, while the liquid carbon dioxide flows through a third flow path where it is vaporized at 410 pounds per square inch gauge. This re-evaporated carbon dioxide is expanded to −70° F. and 60 pounds per square inch gauge and the cold carbon dioxide gas passed through a fourth flow path in the heat exchanger. About 2,800 horsepower is generated on the expansion of the carbon dioxide.

The resulting product fuel gas has a gross heating value of 630 B. t. u. and the following composition:

| | Mol per cent |
|---|---|
| Carbon monoxide | 23.8 |
| Carbon dioxide | 14.1 |
| Water | 0.0 |
| Hydrogen | 5.3 |
| Nitrogen | 3.9 |
| Methane | 52.9 |

The precooler is used primarily as a means of reducing the water content of the gas fed to the reversing heat exchanger. The water load in the heat exchanger amounts to only about 150 pounds per hour.

Obviously many modifications and variations of the invention, as hereinbefore set forth, may be made without departing from the spirit and scope thereof and, therefore, only such limitations should be imposed as are indicated in the appended claims.

I claim:

1. A process for the separation of carbon dioxide from gaseous mixtures thereof comprising carbon monoxide and gases of lower boiling point than carbon monoxide which comprises passing a stream of said mixture under superatmospheric pressure above about 50 pounds per square inch gauge through a cooled first heat exchange element of a heat exchange system having at least four elements in heat exchange relationship with one another to cool the mixture to a temperature below the dew point of carbon dioxide in said mixture but not below about −70° F. thereby condensing carbon dioxide from said mixture, separating the resulting condensate from the uncondensed portion of the mixture, passing the uncondensed portion of the mixture through a second heat exchange element of said heat exchange system to cool said first element, passing the condensate to a third heat exchange element of said heat exchange system wherein it is evaporated cooling said first element, expanding the gases resulting from evaporation of said condensate, and passing the resulting cooled expanded gas through a fourth heat exchange element of said heat exchange system to cool said first element, said heat exchange elements serving to transfer heat from said mixture to said separated streams.

2. A process for the separation of carbon dioxide from gaseous mixtures thereof comprising carbon monoxide and gases of lower boiling point than carbon monoxide which comprises passing a stream of said mixture under superatmospheric pressure above about 50 pounds per square inch gauge through a cooled first heat exchange element of a heat exchange system having at least four elements in heat exchange relationship with one another to cool the mixture to a temperature below the dew point of carbon dioxide in said mixture but not below about −70° F. thereby condensing carbon dioxide from said mixture, separating the resulting condensate from the uncondensed portion of the mixture, passing the uncondensed portion of the mixture through a second heat exchange element of said heat exchange system to cool said first element, passing the condensate to a third heat exchange element of said heat exchange system wherein it is evaporated cooling said first element, expanding the gases resulting from evaporation of said condensate, passing the resulting cooled expanded gas through a fourth heat exchange element of said heat exchange system to cool said first element, said heat exchange elements serving to transfer heat from said mixture to said separated streams, and periodically switching the flow of the stream of said gaseous mixture and the stream of expanded gas through their respective heat exchange elements whereby the mixture passes through the element formerly occupied by the expanded gas and the expanded gas flows through the element formerly occupied by the mixture.

DU BOIS EASTMAN.

REFERENCES CITED

The following references are of record in the file of this patent:

UNITED STATES PATENTS

| Number | Name | Date |
|---|---|---|
| 1,537,193 | Roberts et al. | May 12, 1925 |
| 1,810,312 | Hasche | June 16, 1931 |
| 2,039,330 | McKee | May 5, 1936 |
| 2,551,399 | Silverberg | May 1, 1951 |